(12) United States Patent
Kitamura et al.

(10) Patent No.: US 6,379,451 B1
(45) Date of Patent: Apr. 30, 2002

(54) PIGMENT COMPOSITION AND AQUEOUS PIGMENT DISPERSION PRODUCT USING THE SAME

(75) Inventors: Kenji Kitamura; Ataru Chiba, both of Tokyo (JP)

(73) Assignee: Toyo Ink Mfg. Co., Ltd., Tokyo (JP)

(*) Notice: Subject to any disclaimer, the term of this patent is extended or adjusted under 35 U.S.C. 154(b) by 0 days.

(21) Appl. No.: 09/542,906

(22) Filed: Apr. 4, 2000

(30) Foreign Application Priority Data

Apr. 5, 1999 (JP) .......................................... P11-097168
Apr. 5, 1999 (JP) .......................................... P11-097169

(51) Int. Cl.$^7$ ............................................. C09B 67/00
(52) U.S. Cl. .................. 106/413; 106/412; 106/493; 106/494; 106/495; 106/496; 106/497; 106/498; 106/499
(58) Field of Search .................. 106/412, 413, 106/493, 494, 495, 496, 497, 498, 499

(56) References Cited

U.S. PATENT DOCUMENTS 6,056,814 A * 5/2000 Kato et al. .................. 106/412

FOREIGN PATENT DOCUMENTS

| JP | 55-075453 | 6/1980 |
| JP | 9-188845 | 7/1997 |
| JP | 9-217019 | 8/1997 |

* cited by examiner

*Primary Examiner*—Anthony Green
(74) *Attorney, Agent, or Firm*—Oblon, Spivak, McClelland, Maier & Neustadt, P.C.

(57) ABSTRACT

There are disclosed a pigment composition comprising a dry-milled pigment, a water-soluble resin, and a nonionic surfactant composed of a compound having an acetylenic linkage; and a method for producing a pigment composition, comprising dry-milling a pigment containing coarse particles in the presence of a water-soluble resin and a nonionic surfactant composed of a compound having an acetylenic linkage. The production method is also possible in the form of comprising (a) dry-milling a pigment containing coarse particles in the presence of a nonionic surfactant composed of a compound having an acetylenic linkage thereby obtaining an intermediate milled product, and (b) further dry-milling a mixture of the intermediate milled product and a water-soluble resin. For producing an aqueous pigment dispersion product, there is also disclosed herein a method comprising the steps of (a) dry-milling a pigment containing coarse particles in the presence of a water-soluble resin thereby obtaining a milled product, and (b) dispersing the milled product in water in the presence of a nonionic surfactant composed of a compound having an acetylenic linkage.

14 Claims, No Drawings

PIGMENT COMPOSITION AND AQUEOUS PIGMENT DISPERSION PRODUCT USING THE SAME

BACKGROUND OF THE INVENTION

1. Field of the Invention

The present disclosure is related to the disclosures provided in the following Japanese patent applications filed prior to the filing of the present application: "METHOD FOR PRODUCING AQUEOUS PIGMENT DISPERSION", filed as a Japanese Patent Application No. 11-97168; and "PIGMENT COMPOSITION AND AQUEOUS PIGMENT DISPERSION PRODUCT USING THE SAME", filed as a Japanese Patent Application No. 11-97169; and the disclosures of the aforementioned applications are hereby expressly incorporated by reference herein in their entireties.

The present invention relates to a pigment composition that is easily dispersed in an aqueous medium. Specifically, the present invention relates to a pigment composition that can be produced in a single step without using water and a solvent in large amounts as in the conventional methods; and an aqueous pigment dispersion product comprising the same.

2. Description of the Prior Art

Hitherto, as a method for producing an aqueous dispersion product of a pigment, there has been adopted a method of mixing a pigment treated to be suitable for an aqueous system with dispersing varnish and then dispersing the mixture in an aqueous system in a disperser such as a sand mill or a bead mill with massive energy and time.

The pigment used in such a production of an aqueous dispersion product as above is finished into a pigment that can be used for an aqueous dispersion product after passing through steps requiring a great deal of energy and time. For example, in a pigmentation step based on wet-milling of a crude pigment, the crude pigment is milled in the presence of grinding media by means of a milling apparatus such as a kneader. Such a pigmentation step using mechanical power requires massive kneading energy and time for milling and a great deal of energy and time for separating and purifying the grinding media from the resultant pigment.

Against various processes typically used to produce an aqueous dispersion product of a pigment, as described above, the following methods have been recently suggested: a method of making a milled substance into a pigmentary form in the presence of a surfactant, as disclosed in Japanese Patent Application Laid-Open No. 55-75453; a method of dry-milling a crude pigment and mechanically dispersing a mixture of the dry-milled substance, a resin and an organic solvent, as disclosed in Japanese Patent Application Laid-Open No. 9-217019; and a method of kneading a mixture of crude copper phthalocyanine, a resin and an organic liquid, as disclosed in Japanese Patent Application Laid-Open No. 9-188845.

However, by any one of the above-mentioned methods in the prior art, a pigment composition capable of being dispersed in an aqueous medium with low mechanical energy cannot be economically produced.

SUMMARY OF THE INVENTION

Surprisingly, the present inventors have found out that when, upon the production of the aqueous dispersion of a pigment and a water-soluble resin, a specific surfactant, that is, a nonionic surfactant comprising a compound having in its molecule an acetylenic linkage is added thereto at a suitable timing, the dispersibility of the pigment particles in an aqueous system, particularly in an alkali aqueous solution, can be remarkably improved.

An object of the present invention is to provide a method for producing a pigment composition which is capable of being easily dispersed in an aqueous medium in a single step without using a large amount of water or a solvent.

Another object of the present invention is to provide a pigment composition having an excellent dispersibility as herein-above mentioned, and an aqueous dispersion product thereof.

These and other objects of the invention are satisfied by a pigment composition comprising a dry-milled pigment, a water-soluble resin, and a nonionic surfactant composed of a compound having an acetylenic linkage; and a method for producing a pigment composition, comprising dry-milling a pigment containing coarse particles in the presence of a water-soluble resin and a nonionic surfactant composed of a compound having an acetylenic linkage.

As a production method of the pigment composition, some variations are also possible within the scope of the present invention. One example of such variations is a method comprising the steps of (a) dry-milling a pigment containing coarse particles in the presence of a nonionic surfactant composed of a compound having an acetylenic linkage thereby obtaining an intermediate milled product, and (b) further dry-milling a mixture of the intermediate milled product and a water-soluble resin.

As a method for producing an aqueous pigment dispersion product, one of the most important examples is a method comprising the steps of (a) dry-milling a pigment containing coarse particles in the presence of a water-soluble resin thereby obtaining a milled product, and (b) dispersing the milled product in water in the presence of a nonionic surfactant composed of a compound having an acetylenic linkage.

The water-soluble resin may be water-soluble in the presence of an alkali. Especially, acrylic resin is preferable. One category of pigments applicable to the present invention is those composed of a condensed polycyclic compound. It should be also noted that the present invention can be quite effectively applicable to, though not specifically limited to, a phthalocyanine pigment. The nonionic surfactant may be an acetylene glycol compound such as 2,4,7,9-tetramethyl-5-decyne-4,7-diol or an ethylene oxide adduct thereof.

In the pigment composition according to the invention, the dry-milled pigment may be composed of pigment particles having surfaces coated with the water-soluble resin, which can be readily dispersed into an aqueous medium, especially aqueous solution of sodium hydroxide.

For effectively achieving the objects of the present invention, the water-soluble resin is preferably in an amount of 2 to 50% by weight and the nonionic surfactant is preferably in an amount of 1 to 20% by weight based on an amount of the pigment, in the pigment composition.

The pigment containing coarse particles, which is supposed to be milled, is typically a crude pigment.

In the presence of surfactant, the surfactant produces a surface treating effect on the surface of the pigment particles to improve the hydrophilic properties of the surface thereby significantly improving the affinity of the pigment particles to the resin. In the present invention, a specific compound as above-characterized is used for such surface activating purpose. Along with the surface treating function itself, these compounds also have a high permeability to penetrate into a minute space of material such as pigment particles. Pigment particles are usually composed of smaller particles coagulated each other, namely aggregate of primary particles. Because of this additional property, these compounds can permeate into inside of such an aggregate, and weaken the coagulation force. Wetting and adsorption of the resin to the surface of pigment particles also proceed based on the original surface treating effect. It is reasoned that owing to such double effects produced by the surface treating agent in the present invention, extremely high dispersibility of the pigment composition can be attained.

Therefore, according to the present invention, a pigment can be dispersed in water by a simple operation. According to the present invention, it is possible to provide, at low costs, an aqueous dispersion product having a quality that is equal to or higher than those obtained by the salt milling method using a solvent, which has been adopted as an ordinary pigment-producing method.

DETAILED DESCRIPTION OF THE INVENTION

Examples of the pigment to which the present invention can be applied are, though not specifically limited to, pigments composed of condensed polycyclic compounds such as phthalocyanine pigments, quinacridone pigments, and dioxazine pigments; and azo pigments such as monoazo pigments and bisazo pigments. The pigment that is subjected to dry-milling may be a pigment containing coarse pigment particles, which are not preferable as a final pigmentary form. A preferred example to which the present invention can be applied is a crude pigment composed of a condensed polycyclic compound.

The water-soluble resin may be a resin that is usually used as a resin component or a binder component of an aqueous pigment dispersion product, or a resin that is compatible with other components added to an ink concentrate using the pigment composition of the present invention. Examples of the water-soluble resin that can be preferably used include acrylic resins such as acrylic ester polymers, acryl-styrene copolymers and acryl-α-methylstyrene copolymers. These acrylic resins can be dissolved in water in the presence of an alkali component such as an alkali metal ion, amine or ammonia. From the viewpoint of easy handling, it is preferred that the water-soluble resin added upon dry-milling is in a pellet form.

In the present invention, the amount of the water-soluble resin added upon dry-milling is 2 to 50% and preferably 10 to 25% by weight of the amount of the pigment. When the added amount is more than 50% by weight, the ratio of the resin in the concentrate using the pigment composition obtained by the dry-milling is high, and hence unfavorably the aqueous dispersion product is restrictedly used or cannot be used at all. When the added amount is less than 2% by weight, it is difficult that the pigment composition obtained by the dry-milling is deflocculated in an aqueous medium.

The nonionic surfactant containing an acetylenic linkage may be an acetylene glycol compound. Specific examples thereof include 2,4,7,9-tetramethyl-5-decyne-4,7-diol, 3,6-dimethyl-4-octyne-3,6-diol, 2,5-dimethyl-3-hexyne-2,5-diol, or ethylene oxide adducts thereof. It is preferred to use a mixture of the nonionic surfactant and ether or glycol.

In the present invention, the amount of the nonionic surfactant added upon dry-milling or added upon dispersion of the pigment composition in water is preferably 1 to 20%, more preferably 3 to 10% by weight, based on the amount of the pigment. When the amount of the surfactant is larger than the above-mentioned upper limit, it is highly feared that the milled substance adheres to each other in a dry-milling apparatus, or the use of the resultant aqueous pigment dispersion product may be unfavorably limited. When the amount of the surfactant is smaller than the lower limit, the pigment composition is not deflocculated in the vehicle. In the case that in particular a phthalocyanine pigment is used, the color of the pigment is not developed. It is also possible to use not only the nonionic surfactant having an acetylene group, but also a different surfactant together with the nonionic surfactant.

In the dry-milling of the present invention, a milling apparatus having therein grinding media such as beads may be used. The milling apparatus pulverizes materials to be milled in their powder form without flocculation of the pigment with the aid of water or a solvent. Examples of such a milling apparatus include a dry attritor, a ball mill, and vibration mill. In view of productivity, the attritor is preferred. The dry-milling may be conducted in a manner such that all of the three components, that is, the pigment to be milled, the nonionic surfactant, and the water-soluble resin are milled simultaneously in their mixed state. However, It is more preferable that the nonionic surfactant is added to the pigment firstly and milling is conducted to the mixture as a first step, and subsequently the water-soluble resin is added thereto and dry-milling further conducted as a second milling step. As the case may be, it is also possible to add, to the pigment containing coarse particles, only the water-soluble resin firstly, and dry-mill the mixture of the pigment and resin.

It is necessary to set suitable conditions for the dry-milling in accordance with the specific milling apparatus to be used. Milling temperature is preferably 30 to 150° C. When the milling temperature is higher than the softening temperature of the water-soluble resin that is present together, it is highly feared that the milled materials adhere to each other in the milling apparatus. Therefore, it is necessary to set the temperature to a value lower than the softening point of the water-soluble resin if possible. The milling is preferably conducted for 10 min to 6 hours. When the milling time is shorter, particles milled in an insufficient extent may be unfavorably contained in the pigment. When the milling time is longer, productivity of sufficiently milled pigment unfavorably deteriorates.

The pigment composition of the present invention is in a powder form wherein the surfaces of the finely-milled pigment particles are coated with the water-soluble resin or with the surfactant and the water-soluble resin, and is easily deflocculated and dispersed in water in the presence of an alkali. The pigment composition of the present invention can be made into an aqueous pigment dispersion product in the presence of the alkali by a simple operation, for example, by mixing the composition with a vehicle prepared for use of making aqueous pigment dispersion and stirring the mixture. According to the present invention, the particle size of the dispersed pigment particles contained in the pigment composition can be made substantially equal to that of pigment particles obtained by the salt milling method using a solvent.

The aqueous pigment dispersion product of the present invention can be used, for example, as aqueous paint, textile printing agents, aqueous ink, ink for inkjet printing, dispersing solution for a color filter, or the like.

EXAMPLES

The present invention will be in more detail described by way of examples hereinafter. A pigment used as a standard pigment in the examples is a pigment prepared from a crude pigment by the salt milling method using a solvent. For measurement of crystal types, a X-ray diffraction device was used. Particle sizes and particle forms were observed with a transmission electron microscope.

Example 1

A dry attritor was charged with 83 parts by weight of crude copper phthalocyanine, and 5 parts by weight of "Olfine STG" made by Nissin Chemical Industry as a nonionic surfactant having an acetylenic linkage, and the mixture was milled at 90° C. for 30 minutes. Next, 12 parts by weight of an acrylic resin "Johncryl J-683" made by Johnson Polymer Co., Ltd. were added thereto, and the mixture was further milled at 90° C. for 20 minutes to obtain a pigment composition.

The resultant pigment composition was in a powder form wherein the surfaces of the milled pigment particles were coated with the acrylic resin, and the content by percentage of $\alpha$-type crystal in the pigment was 2% or less.

Next, 18 parts by weight of the obtained pigment composition were added to 20 parts by weight of an aqueous solution containing sodium hydroxide for dissolving the resin, and the mixture was gently stirred at room temperature to obtain a concentrated dispersion product. To the resultant concentrated dispersion product were added 62 parts by weight of an aqueous styrene acrylic emulsion, to prepare a final ink.

As compared with a standard ink containing the same content of the standard pigment, the ink of Example 1 was superior to the standard ink in tinting strength, transparency, clearness and the like. The tinting strength had a quality of about 140%. The average dispersion particle size of the final ink was 80 to 120 nm.

Example 2

A pigment composition was obtained in the same way as in Example 1 except that 5 parts by weight of "Surfynol TG" made by Nissin Chemical Industry were used as a nonionic surfactant having an acetylenic linkage. The obtained pigment composition was in a powder form wherein the surfaces of the milled pigment particles were coated with the acrylic resin, and the content by percentage of $\alpha$-type crystal in the pigment was 2% or less.

The same way as in Example 1 was then performed to obtain a final ink. As compared with the standard ink containing the same content of the standard pigment, the ink of Example 2 was superior to the standard ink in tinting strength, transparency, clearness and the like. The tinting strength had a quality of about 130%. The average dispersion particle size of the final ink was 80 to 120 nm.

Example 3

A pigment composition was obtained in the same way as in Example 1 except that 5 parts by weight of "Surfynol 504" made by Nissin Chemical Industry were used as a nonionic surfactant having an acetylenic linkage. The obtained pigment composition was in a powder form wherein the surfaces of the milled pigment particles were coated with the acrylic resin, and the content by percentage of $\alpha$-type crystal in the pigment was 2% or less.

The same way as in Example 1 was then performed to obtain a final ink. As compared with the standard ink containing the same content of the standard pigment, the ink of Example 3 was superior to the standard ink in tinting strength, transparency, clearness and the like. The tinting strength had a quality of about 110%. The average dispersion particle size of the final ink was 80 to 120 nm.

Comparative Example 1

A pigment composition was obtained in the same way as in Example 1 except that 5 parts by weight of a nonionic surfactant having no acetylenic linkage, i.e., "Newcol 723" made by Nippon Nyukazai Co., Ltd. were used instead of the nonionic surfactant having an acetylenic linkage. The obtained pigment composition was in a powder form wherein the surfaces of the milled pigment particles were coated with the acrylic resin, and the content by percentage of $\alpha$-type crystal in the pigment was 2% or less.

The same way as in Example 1 was then tried in order to obtain a final ink. However, its color was hardly developed.

Comparative Example 2

A pigment composition was obtained in the same way as in Example 1 except the omission of the step wherein 12 parts by weight of the acrylic resin Johncryl J-683 made by Johnson Polymer Co., Ltd. were added and the mixture was milled at 90° C. for 20 minutes. The content by percentage of $\alpha$-type crystal in the pigment was 2% or less.

The same way as in Example 1 was then performed to obtain a final ink. As compared with the standard ink containing the same content of the standard pigment, the final ink lacked clearness, and the tinting strength was about 70%.

Example 4

A pigment composition was obtained in the same way as in Example 1 except that 3.8 parts by weight of "Olfine STG" made by Nissin Chemical Industry, which were a reduced amount, were used as a nonionic surfactant having an acetylenic linkage. The obtained pigment composition was in a powder form wherein the surfaces of the milled pigment particles were coated with the acrylic resin, and the content by percentage of $\alpha$-type crystal in the pigment was 2% or less.

The same way as in Example 1 was then performed to obtain a final ink. As compared with the standard ink containing the same content of the standard pigment, the ink of Example 4 was superior to the standard ink in tinting strength, transparency, clearness and the like. The tinting strength had a quality of about 130%. The average dispersion particle size of the final ink was 80 to 120 nm.

Example 5

A pigment composition was obtained in the same way as in Example 1 except that 6.5 parts by weight of "Olfine STG" made by Nissin Chemical Industry, which were an increased amount, were used as a nonionic surfactant having an acetylenic linkage. The obtained pigment composition was in a powder form wherein the surfaces of the milled pigment particles were coated with the acrylic resin, and the content by percentage of $\alpha$-type crystal in the pigment was 2% or less.

The same way as in Example 1 was then performed to obtain a final ink. As compared with the standard ink containing the same content of the standard pigment, the ink of Example 5 was superior to the standard ink in tinting strength, transparency, clearness and the like. The tinting strength had a quality of about 140%. The average dispersion particle size of the final ink was 80 to 120 nm.

Example 6

A dry attritor was charged with 84 parts by weight of crude copper phthalocyanine and 16 parts by weight of an acrylic resin "Johncryl J-679" made by Johnson Polymer Co., Ltd., and the mixture was milled at 90° C. for 20 minutes to obtain a pigment composition. The obtained pigment composition was in a powder form wherein the surfaces of the milled pigment particles were coated with the acrylic resin, and the content by percentage of α-type crystal in the pigment was about 50%.

Next, 18 parts by weight of the obtained pigment composition, together with 1.0 part by weight of "Olfine STG" made by Nissin Chemical Industry as a nonionic surfactant having an acetylenic linkage, were added to 20 parts by weight of an aqueous solution containing sodium hydroxide for dissolving the resin, and the mixture was gently stirred at room temperature to obtain a concentrated dispersion product. To the resultant concentrated dispersion product were added 61 parts by weight of an aqueous styrene acrylic emulsion, to prepare a final ink.

As compared with a standard ink containing the same content of the standard pigment, the ink of Example 6 was superior to the standard ink in tinting strength, transparency, clearness and the like. The tinting strength had a quality of about 140%. The average dispersion particle size of the final ink was 80 to 120 nm.

Example 7

A final ink was obtained in the same way as in Example 6 except that 1.0 part by weight of "Surfynol TG" made by Nissin Chemical Industry was used as a nonionic surfactant having an acetylenic linkage. As compared with the standard ink containing the same content of the standard pigment, the ink of Example 7 was superior to the standard ink in tinting strength, transparency, clearness and the like. The tinting strength had a quality of about 130%. The average dispersion particle size of the final ink was 80 to 120 nm.

Example 8

A final ink was obtained in the same way as in Example 6 except that 1.0 parts by weight of "Surfynol 504" made by Nissin Chemical Industry were used as a nonionic surfactant having an acetylenic linkage. As compared with the standard ink containing the same content of the standard pigment, the ink of Example 8 was superior to the standard ink in tinting strength, transparency, clearness and the like. The tinting strength had a quality of about 110%. The average dispersion particle size of the final ink was 80 to 120 mn.

Comparative Example 3

A concentrated dispersion product was obtained in the same way as in Example 6 except that 1.0 part by weight of "Olfine STG" made by Nissin Chemical Industry was not used at all as a nonionic surfactant having an acetylenic linkage. Further, 62 parts by weight of an aqueous styrene acrylic emulsion were added to the resultant concentrated dispersion product, to try to prepare a final ink. However, its color was hardly developed.

Comparative Example 4

By means of a dry attritor, crude copper phthalocyanine was milled at 90° C. for 20 minutes. The milled pigment had a content by percentage of α-type crystal of about 30%.

Next, 15 parts by weight of the resultant pigment, together with 1.0 part by weight of "Olfine STG" made by Nissin Chemical Industry as a nonionic surfactant having an acetylenic linkage, were added to 20 parts by weight of water. The mixture was then gently stirred at room temperature to obtain a concentrated dispersion product. To the resultant concentrated dispersion product were added 64 parts by weight of an aqueous styrene acrylic emulsion, to try to prepare a final ink. However, its color was hardly developed.

Example 9

A dry attritor was charged with 84 parts by weight of crude copper phthalocyanine and 16 parts by weight of an acrylic resin "Johncryl J-679" made by Johnson Polymer Co., Ltd., and the mixture was milled at 90° C. for 20 minutes. The resultant pigment composition was in a powder form wherein the surfaces of the milled pigment particles were coated with the acrylic resin, and the content by percentage of α-type crystal in the milled pigment was about 50%.

Next, 18 parts by weight of the resultant pigment composition, together with 0.5 part by weight of "Olfine STG" made by Nissin Chemical Industry as a nonionic surfactant having an acetylenic linkage, were added to 20.5 parts by weight of an aqueous solution containing sodium hydroxide for dissolving the resin. The mixture was then gently stirred at room temperature to obtain a concentrated dispersion product. To the resultant concentrated dispersion product were added 61 parts by weight of an aqueous styrene acrylic emulsion, to prepare a final ink.

As compared with a standard ink containing the same content of the standard pigment, the ink of Example 9 was superior to the standard ink in tinting strength, transparency, clearness and the like. The tinting strength had a quality of about 120%. The average dispersion particle size of the final ink was 80 to 120 nm.

Example 10

The same way as in Example 9 was performed except that 2.0 parts by weight of "Olfine STG" made by Nissin Chemical Industry, which were an increased amount, were used as a nonionic surfactant having an acetylenic linkage and accordingly 19 parts by weight of an aqueous solution containing sodium hydroxide for dissolving the resin, which were an reduced amount, were used. In this way, a concentrated dispersion product was obtained, and then a final ink was obtained.

As compared with the standard ink containing the same content of the standard pigment, the ink of Example 10 was superior to the standard ink in tinting strength, transparency, clearness and the like. The tinting strength had a quality of about 150%. The average dispersion particle size of the final ink was 80 to 120 nm.

What is claimed is:

1. A pigment composition comprising a dry-milled pigment, a water-soluble resin, and a nonionic surfactant composed of a compound having an acetylenic linkage, wherein the water-soluble resin is an acrylic resin, the dry-milled pigment is composed of a condensed polycyclic compound, and the nonionic surfactant is an acetylene glycol compound, and further wherein the water-soluble resin is in an amount of 2 to 50% by weight and the nonionic surfactant is in an amount of 1 to 20% by weight based on an amount of the dry-milled pigment.

2. The pigment composition according to claim 1, wherein the water-soluble resin is water-soluble in the presence of an alkali.

3. The pigment composition according to claim 1, wherein the dry-milled pigment is phthalocyanine pigment.

4. The pigment composition according to claim 1, wherein the acetylene glycol compound is 2,4,7,9-tetramethyl-5-decyne-4,7-diol or an ethylene oxide adduct thereof.

5. The pigment composition according to claim 1, wherein the dry-milled pigment is composed of pigment particles having surfaces coated with the water-soluble resin.

6. An aqueous pigment dispersion product wherein the pigment composition according to claim 1 is dispersed in water.

7. A method for producing a pigment composition, comprising dry-milling a pigment containing coarse particles in the presence of a water-soluble resin and a nonionic surfactant composed of a compound having an acetylenic linkage, wherein the water-soluble resin is an acrylic resin, the pigment is composed of a condensed polycyclic compound, and the nonionic surfactant is an acetylene glycol compound, and further wherein the water-soluble resin is in an amount of 2 to 50% by weight and the nonionic surfactant is in an amount of 1 to 20% by weight based on an amount of the pigment.

8. The method according to claim 7, wherein the pigment is a crude pigment.

9. A method for producing a pigment composition, said method comprising the steps of:
  (a) dry-milling a pigment containing coarse particles in the presence of a nonionic surfactant composed of a compound having an acetylenic linkage thereby obtaining an intermediate milled product, and
  (b) further dry-milling a mixture of the intermediate milled product and a water-soluble resin,
  wherein the water-soluble resin is an acrylic resin, the pigment is composed of a condensed polycyclic compound, and the nonionic surfactant is an acetylene glycol compound, and further wherein the water-soluble resin is in an amount of 2 to 50% by weight and the nonionic surfactant is in an amount of 1 to 20% by weight based on an amount of the pigment.

10. The method according to claim 9, wherein the pigment is a crude pigment.

11. A method for producing an aqueous pigment dispersion product, said method comprising the steps of:
  (a) dry-milling a pigment containing coarse particles in the presence of a water-soluble resin thereby obtaining a milled product, and
  (b) dispersing the milled product in water in the presence of a nonionic surfactant composed of a compound having an acetylenic linkage,
  wherein the water-soluble resin is an acrylic resin, the pigment is composed of a condensed polycyclic compound, and the nonionic surfactant is an acetylene glycol compound, and further wherein the water-soluble resin is in an amount of 2 to 50% by weight and the nonionic surfactant is in an amount of 1 to 20% by weight based on an amount of the pigment.

12. The method according to claim 11, wherein the pigment is a crude pigment.

13. The method according to claim 11, wherein the water-soluble resin is water-soluble in the presence of an alkali.

14. The method according to claim 11 wherein the acetylene glycol compound is 2,4,7,9-tetramethyl-5-decyne-4,7-diol or an ethylene oxide adduct thereof.

* * * * *